United States Patent [19]
Krause

[11] Patent Number: 4,689,065
[45] Date of Patent: Aug. 25, 1987

[54] OPTICAL WAVEGUIDE GLASS FIBER FLAME PROCESSING

[75] Inventor: John T. Krause, New Providence, N.J.

[73] Assignee: American Telephone and Telegraph Company, AT&T Bell Laboratories, Murray Hill, N.J.

[21] Appl. No.: 829,527

[22] Filed: Feb. 14, 1986

[51] Int. Cl.⁴ ............................................. C03B 37/023
[52] U.S. Cl. .......................................... 65/2; 65/3.12; 65/4.21; 65/10.2; 65/42
[58] Field of Search .................. 65/2, 3.11, 3.12, 10.2, 65/42, 36, 4.2, 4.21

[56] References Cited

U.S. PATENT DOCUMENTS

| | | | |
|---|---|---|---|
| 3,825,319 | 7/1974 | Cook et al. | 350/96 |
| 4,217,027 | 8/1980 | MacChesney et al. | 350/96.3 |
| 4,326,870 | 4/1982 | Bendit et al. | 65/4.21 |
| 4,439,221 | 3/1984 | Smyth et al. | 65/4.21 |
| 4,557,557 | 12/1985 | Gleason et al. | 65/4.21 X |

FOREIGN PATENT DOCUMENTS

| | | | |
|---|---|---|---|
| 0025585 | 3/1981 | European Pat. Off. | 65/4.21 |
| 57-92533 | 6/1982 | Japan | 65/4.21 |

OTHER PUBLICATIONS

PCT WO85/03283 Aug. 1985 Priority U.S. Date 1/24/1984 Krause.
"Tensile Strengths <4 GPa for Lightguide Fusion Splices", *Electronics Letters*, J. T. Krause et al., 1981, pp. 812-813.
"Splice Loss of Single Mode Fiber as Related to Fusion Time, Temperature, and Index Profile Alteration", *Istituto Internazionale Delle Comunicazioni*, J. T. Krause et al., 1985, pp. 629-631.

*Primary Examiner*—Robert L. Lindsay
*Attorney, Agent, or Firm*—Peter Á. Businger

[57] ABSTRACT

In the interest of reducing the effect on tensile strength of flame processing of a silica-based optical fiber waveguide, such processing is by a method in which a significant flow of oxygen surrounds a flame produced by combustion of hydrogen, deuterium, ammonia, or deuterated ammonia. Flame processing may be for purposes such as, e.g., fiber drawing, fiber fusing for the sake of lateral coupling, refractive index modification by the diffusion of dopants, and fiber splicing in the manufacture of long lengths of fiber. Even though there is no use of chlorine, at least 80 percent of spliced fibers have a tensile strength greater than or equal to 500 kpsi (3.45 GPa) as is desirable in optical fiber cable manufacture.

14 Claims, 1 Drawing Figure

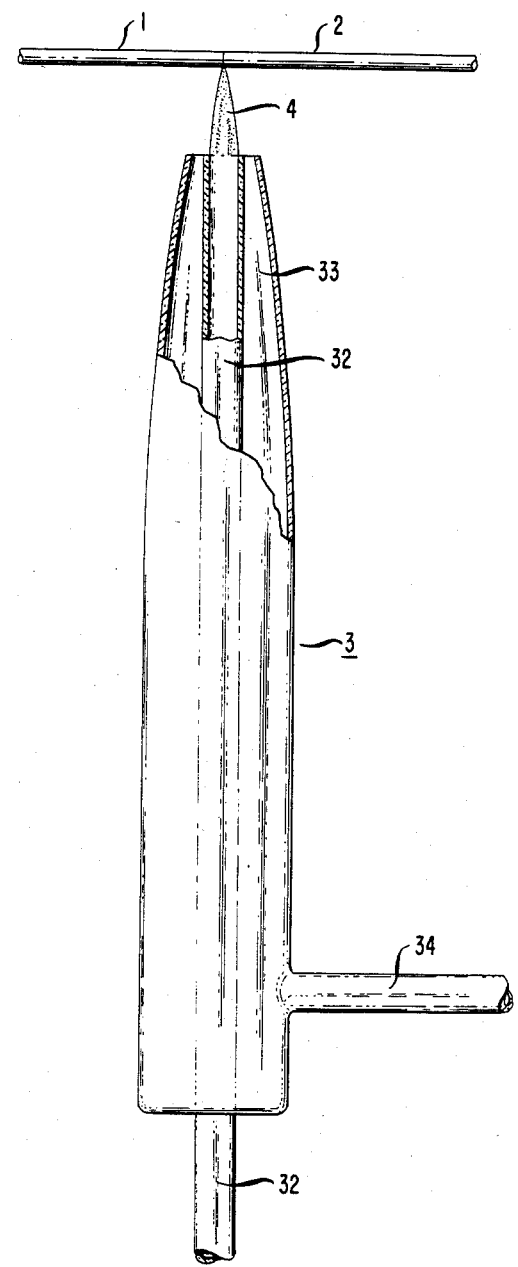

OPTICAL WAVEGUIDE GLASS FIBER FLAME PROCESSING

TECHNICAL FIELD

The invention is concerned with optical waveguide glass fibers having low optical loss and high tensile strength as, e.g., in the case of fibers having a low-loss, high-strength splice connection.

BACKGROUND OF THE INVENTION

Optical waveguide glass fibers have become an increasingly important long-distance communications medium, and their commercial use for communications over intermediate and short distances is increasing as well. Manufacture of optical waveguide fibers typically is by drawing from a preform as may be made in a number of ways; in this respect see, e.g., U.S. Pat. No. 4,217,027, issued Aug. 12, 1980 to J. B. MacChesney et al. For the sake of mechanical protection, drawn fibers typically are provided with a plastic coating, and coated fibers may be assembled into strands and cables.

In the construction of long-distance communications facilities, special attention is due the optical and physical interconnection of lengths of fiber. In this respect, heat fusion splicing has been developed as reported, e.g., by J. T. Krause et al., "Tensile Strengths >4 GPa for Light Guide Fusion Splices", *Electronics Letters*, Vol. 17 (1981), pp. 812–813. There, the choice of processing conditions is strongly influenced by considerations of tensile strength of a resulting spliced fiber, this in view of considerable tensile forces as may be applied in the course of cable installation, e.g., by pulling through ducts or by laying at sea.

Heat fusion splicing typically involves the use of a torch producing a flame which results upon the combustion of gases such as, e.g., hydrogen or ammonia. And, of course, such a flame can be used for high-temperature processing for purposes other than splicing. For example, flame processing can be used to facilitate drawing of a fiber to a smaller diameter, for side-by-side fusing of fibers as, e.g., in the manufacture of optical couplers and taps, as well as for the sake of modifying dopant profile. With respect to dopant profile modification see, e.g., J. T. Krause et al., "Splice Loss of Single-mode Fiber as Related to Fusion Time, Temperature, and Index Profile Alteration", IOOC-ECOC '85, Technical Digest, Vol. 1, Istituto Internazionale delle Comunicazioni, 1985; pp. 629–631. And, with respect to diameter reduction, see, e.g., U.S. Pat. No. 3,825,319, issued July 23, 1974 to J. S. Cook et al.

While flame processing with chlorine addition has been found to result in highest tensile strength in a processed fiber, there remain circumstances under which the use of chlorine is inadvisable, e.g., on the basis of safety or environmental considerations. Accordingly, there is demand for effective flame processing in the absence of chlorine.

SUMMARY OF THE INVENTION

Flame processing resulting in high-strength, low-loss optical fiber waveguides is effected in the absence of chlorine by a method in which a strong flow of oxygen surrounds a flame produced by a flow of a combustible gas such as hydrogen, deuterium, ammonia, or deuterated ammonia. Resulting fibers have satisfactorily high tensile strength for most applications; for example, if processing is for the sake of fiber splicing, at least 80 percent of fibers spliced in accordance with th invention have a tensile strength greater than or equal to 500 kpsi (3.45 GPa).

BRIEF DESCRIPTION OF THE DRAWING

The FIGURE schematically illustrates a preferred embodiment of the invention, namely fiber splicing by heating of abutting fiber segment ends with a torch.

DETAILED DESCRIPTION

The FIGURE shows axially aligned optical fiber segments 1 and 2; torch 3 comprising an inner tube 31 with associated inlet 32 and an outer tube 33 with associated inlet 34; and flame 4 in the process of heating abutting ends of optical fiber segments 1 and 2. Torch 3 is preferably made from an inert, heat resistant material such as, e.g., fused silica.

The invention is directed to flame processing of optical waveguide fibers for purposes such, e.g., fiber splicing, drawing, and coupling. For example, in the case of splicing, long lengths of optical fiber silica glass waveguide are made from two or more shorter lengths or segments, such manufacture involving flame fusion splicing of ends of fiber. Fibers are silica-based, and a preferred amount of at least 90 mole percent of the total glass fiber material is silica. Also, a preferred amount of at least 95 mole percent and preferably at least 98 mole percent of fiber surface material being heated is silica. (Surface material is understood to extend to a depth of at least 10 micrometers and preferably at least 30 micrometers from a fiber mantle surface.) Complementary percentages may be taken up by other glass constituents such as, e.g., dopant oxides.

Fiber diameters of approximately 100–150 micrometers are typical, and a fiber core portion typically has a diameter of from a few micrometers in the case of single-mode fibers to approximately 50 micrometers in the case of multi-mode fibers.

Optical fibers comprise a waveguiding core-cladding structure, the core portion having a refractive index which is greater than the refractive index of the surrounding cladding portion. Fibers intended for single-mode transmission typically have a stepped-index profile; in the case of multi-mode fibers a core-cladding structure preferably has a gradually changing refractive index profile. Raised refractive index of a core portion is conveniently achieved, e.g., by up-doping of silica with alumina, germania, or phosphorus pentoxide; conversely, boron or fluorine can be used for down-doping a silica cladding. Furthermore, dopants may be present for purposes other than waveguiding; e.g., small amounts of phosphorus pentoxide may be added to a cladding for the sake of lowering cladding glass softening temperature.

Processing in accordance with the invention calls for heating at least a portion of at least one optical fiber or fiber segment at typical temperatures in a range of from 1200 degrees C. to 2200 degrees C. or, more typically, from 1500 degrees C. to 2000 degrees C., such temperatures being at or near the glass softening temperature. For example, in the case of splicing, two segments are heated which are essentially coaxially aligned and are brought into end-to-end contact. Or, in the case of the manufacture of a coupler, fiber segments may be aligned side-by-side or twisted together for fusing along the fiber periphery.

Heating in accordance with the invention is by a flame produced by combustion in a flow of gases. Such flow comprises a central flow consisting essentially of a combustible gas such as hydrogen, deuterium, ammonia, deuterated ammonia, or a mixture of such combustible gases, and such flow further comprises a surrounding peripheral flow comprising primarily oxygen. Preferred are a central flow comprising at least 50 and preferably at least 90 percent by volume of combustible gas and a peripheral flow comprising at least 50 and preferably at least 90 volume percent oxygen. Contemplated primarily are complementary percentages of inert flow components such as, e.g., helium or nitrogen, and any appreciable amount of chlorine is excluded.

Preferred flame size (as visually ascertainable and as measured from the tip of a nozzle in the direction of gas flow) is in a range of from 0.5 to 10 mm and preferably from 1 to 5 mm, and the fiber portion or portions being heated are preferably placed into the hottest part near the tip of the flame. Such placement may result in an abrupt exposure to elevated temperature; alternatively, allowance may be made for a gradual increase in fiber temperature, e.g., by gradually turning up a flame towards a placed fiber. Fibers are preferably centered across the flame front. Aspects such as the small size of the flame, centered fiber placement, and the closeness of the fiber to the nozzle are considered to be beneficial in the interest of minimization of turbulence, uniformity of heat gradient and, ultimately, high strength of a spliced fiber.

Moreover, in accordance with the invention, it is particularly important that a strong flow of oxygen be maintained immediately adjacent to and surrounding the flow of combustible gas; such flow is required to have sufficiently high volume as well as sufficiently high velocity. Preferred flows are significantly greater than flows needed to sustain a flame, and preferred velocities are in a preferred range of from 0.3 to 10 m/sec and preferably in a range of from 0.5 to 5 m/sec. Preferred volume of flow adjacent to the flame is a function of a preferred radial thickness of such flow, such thickness being greater than or equal to 0.1 mm as produced, e.g., by one or several concentric orifices of a torch nozzle. Use of such oxygen flow is believed to contribute to high-strength splice connections by a number of mechanisms such as, in particular, cooling of fiber portions adjacent to portions exposed to the ambient, shielding of heated fiber portions from ambient moisture, and removal of water-derived species such as, e.g., $OH^-$ and $H_2O$ reaction products from the vicinity of the heated fiber. (Too high a flow rate of oxygen is precluded, however, in the interest of adequate heating of a fiber portion and also in the interest of avoiding excessive turbulence.)

The following examples illustrate the effectiveness of the disclosed flame processing method as exemplified in the case of fiber splicing. Optical loss introduced into the resulting fiber waveguides by the presence of a splice connection optimally was as low as approximately 0.05 dB, values of up to 0.1 dB being considered as good and values up to 0.2 dB being considered as acceptable. Indeed, such levels were easily met concomitant to accurate alignment of fiber segment ends, and primary concern is with spliced fiber strength.

As can be seen from the examples, desirable levels of tensile strength at or above 500 kpsi (3.45 GPa) are readily achieved in the case of fibers made in accordance with the invention; accordingly, such fibers are suitable for incorporation in optical fiber cables as typically comprising a significant number of five or more fibers. For the sake of comparison, and in contradistinction to the invention, thirty-nine splice connections were made by prior art flame fusion splicing using a slow flow of oxygen and a relatively large flame. Only two of the resulting 39 spliced fibers had acceptable strength of approximately 500 kpsi (3.45 GPa).

EXAMPLE 1

Forty-one splice connections were made by flame fusing optical fiber segments having a nominal waveguide structure as follows: Silica core glass doped with germania for increased refractive index, silica cladding glass doped with fluorine for decreased refractive index and also doped lightly with phosphorus pentoxide for lowered glass softening temperature, essentially pure silica surrounding the cladding and forming the fiber surface, core diameter of approximately 10 micrometers, over-all fiber diameter approximately 125 micrometers.

Heating was by means of a three-orifice torch analogous to the two-orifice torch depicted in the FIGURE, and approximate nozzle dimensions were as follows: A central orifice radius of 0.125 mm, a first wall thickness of 0.8 mm, an intermediate-orifice gap of 0.25 mm, a second wall thickness of 0.8 mm, an outer-orifice gap of 0.125 mm, and a third wall thickness of 0.8 mm. Flow to the central orifice was essentially pure hydrogen which at first was adjusted merely sufficient to maintain a flame. Flow to the intermediate as well as the outer orifices was approximately 0.6 l/min oxygen, resulting in a combined flow of approximately 1.2 l/min at a velocity of approximately 1.5 m/sec and having a radial thickness of approximately 1.6 mm. Fiber ends were aligned and brought into physical contact, and the joined fibers were placed in front of the oxygen-hydrogen flame which was then adjusted to a visual size of approximately 3 mm by increasing the hydrogen flow. Fusing of the joined fiber ends was at temperatures in a range of from approximately 1800 degrees C. to approximately 1900 degress C.; fusion times ranged from approximately 1 to approximately 40 seconds, shorter times being associated with higher temperatures and conversely. The mean strength of the spliced fibers was approximately 706 kpsi (6.87 GPa) with a coefficient of variation of approximately 0.103. Forty or approximately 97 percent of the resulting spliced fibers had a strength greater than 500 kpsi (3.45 GPa).

EXAMPLE 2

Thirty-one splice connections were made under conditions as described above in Example 1, with the exception that there was no gradual turning-up of the flame; instead, joined fiber ends were exposed abruptly to a nominal-size flame. The mean strength of the spliced fibers was approximately 671 kpsi (4.63 GPa) with a coefficient of variation of approximately 0.156. Twenty-eight or approximately 90 percent of the resulting spliced fibers had a strength greater than 500 kpsi (3.45 GPa).

What is claimed is:

1. Method for making at least one silica-based optical waveguide glass fiber having a dopant-induced core-cladding waveguiding structure, said method comprising a step of heat processing at least a portion of at least one silica-based optical waveguide glass fiber segment, heat processing being by means of a flame which results upon combustion in a flow of gases, said flow comprising a first flow portion and a second flow portion surrounding said first flow portion, said first flow portion comprising a significant amount of one or several combustible gases selected from the group consisting of hydrogen, deuterium, ammonia, and deuterated ammonia, said second flow portion comprising a significant amount of oxygen, said method being characterized in that no appreciable amounts of chlorine are present in said flow and said second flow portion having volume and velocity significantly in excess of volume and velocity as required for combustion.

2. Method of claim 1 in which a second silica-based optical waveguide glass fiber segment is aligned with and abutted to said first silica-based optical waveguide glass fiber segment, heating being of abutting end portions of said segments and for a duration which is sufficient to heat-fuse said segments, thereby producing said silica-based optical waveguide fiber as a spliced fiber from said segments.

3. Method of claim 2 in which said at least one silica-based optical waveguide fiber is a significant plurality of silica-based optical waveguide glass fibers, at least 80 percent of the fibers of said plurality having a tensile strength which is greater than or equal to 500 kpsi (3.45 GPa).

4. Method of claim 3 in which said plurality is assembled into an optical waveguide cable.

5. Method of claim 1 in which a second silica-based optical waveguide glass fiber segment is in at least partial lateral contact with said first silica-based optical waveguide glass fiber segment, heating being of a portion along which said segments are in lateral contact and for a duration which is sufficient to heat-fuse said segments.

6. Method of claim 1 in which said segment is being drawn during heating.

7. Method of claim 1 in which said segment is being heated for a duration which is sufficient to result in a significant change of dopant distribution in said portion.

8. Method of claim 1 in in which the material of said segment comprises silica in an amount of at least 90 mole percent.

9. Method of claim 1 in which the surface material of said segment comprises silica in an amount of at least 95 percent.

10. Method of claim 1 in which said second flow portion has a velocity in the range of from 0.3 to 10 m/sec in a region which adjoins said flame and which has a radial thickness which is greater than or equal to 0.1 mm.

11. Method of claim 1 in which said flame has a size in the range of from 0.5 to 10 mm.

12. Method of claim 1 in which said first flow portion comprises at least 50 volume percent of said one or several combustible gases.

13. Method of claim 1 in which said second flow portion comprises at least 50 volume percent oxygen.

14. Method of claim 1 in which flame heating produces a temperature at the surface of said portion in the range of from 1200 degrees C. to 2200 degrees C.

* * * * *